US012536390B2

(12) United States Patent
Sui et al.

(10) Patent No.: US 12,536,390 B2
(45) Date of Patent: Jan. 27, 2026

(54) SECURE RADIO-FREQUENCY IDENTIFICATION SYSTEM

(71) Applicant: International Business Machines Corporation, Armonk, NY (US)

(72) Inventors: Guang Han Sui, Beijing (CN); Peng Hui Jiang, Beijing (CN); Su Liu, Austin, TX (US); Jun Su, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 136 days.

(21) Appl. No.: 18/508,273

(22) Filed: Nov. 14, 2023

(65) Prior Publication Data

US 2025/0156658 A1    May 15, 2025

(51) Int. Cl.
*G06K 7/10* (2006.01)
*G06K 7/00* (2006.01)

(52) U.S. Cl.
CPC ....... *G06K 7/10198* (2013.01); *G06K 7/0008* (2013.01)

(58) Field of Classification Search
CPC ............. G06K 7/0008; G06K 7/10118; G06K 7/10257; G06K 7/10198; G06K 19/073; G06K 19/07309; G06K 19/07318; G06K 19/07327; G06K 19/07345; G06K 19/07363
See application file for complete search history.

(56) References Cited

U.S. PATENT DOCUMENTS

| | | | |
|---|---|---|---|
| 5,103,210 A * | 4/1992 | Rode | G08B 13/242 342/51 |
| 6,731,198 B1 * | 5/2004 | Stobbe | G06K 19/073 340/10.2 |
| 6,891,474 B1 * | 5/2005 | Fletcher | G06K 19/07749 340/572.1 |
| 7,019,639 B2 | 3/2006 | Stilp | |
| 7,248,165 B2 | 7/2007 | Collins | |
| 8,237,549 B2 | 8/2012 | Horne | |
| 8,358,209 B2 * | 1/2013 | Shafer | G08B 13/2417 340/572.1 |

(Continued)

OTHER PUBLICATIONS

Karthikeyan et al., "RFID Security without Extensive Cryptography", SASN'05, Nov. 7, 2005, Alexandria, Virginia, USA, Copyright 2005 ACM, 15 pages. Transactions On Apr. 2008, 8 pages.

(Continued)

*Primary Examiner* — Curtis J King
(74) *Attorney, Agent, or Firm* — Stephen R. Yoder

(57) ABSTRACT

A transmission mode of an interrogation from an RFID reader is the basis for determining a responsive communication. Transmission modes matching a pre-defined pattern are the basis for returning expected information, such as an identification code. When the received interrogations do not match a transmission mode, information not helpful in identification is returned, such as, for example, a null code, an incorrect code, or an error code. An RFID tag includes a circuit for analyzing frequencies of the received interrogation, the analysis revealing the transmission mode, which may include frequency value or range, duration of transmission, and number of frequencies received during the interrogation.

20 Claims, 4 Drawing Sheets

(56) References Cited

U.S. PATENT DOCUMENTS

| | | | |
|---|---|---|---|
| 8,712,334 B2 | 4/2014 | Tuttle | |
| 8,797,144 B2 | 8/2014 | Hinman | |
| 10,628,725 B1* | 4/2020 | Mei | G06K 19/07309 |
| 11,568,410 B1* | 1/2023 | Black | G06Q 20/341 |
| 2004/0012496 A1* | 1/2004 | De Souza | G06K 19/07345 |
| | | | 340/572.3 |
| 2004/0049451 A1 | 3/2004 | Berardi et al. | |
| 2004/0263319 A1* | 12/2004 | Huomo | G08B 13/2417 |
| | | | 340/10.2 |
| 2005/0051351 A1* | 3/2005 | De Jongh | G06K 19/07372 |
| | | | 174/520 |
| 2008/0252459 A1* | 10/2008 | Butler | G06F 3/0659 |
| | | | 340/572.1 |
| 2009/0075592 A1* | 3/2009 | Nystrom | H04L 67/34 |
| | | | 455/41.1 |
| 2009/0231138 A1* | 9/2009 | Lai | G06K 19/0707 |
| | | | 340/10.33 |
| 2009/0237223 A1 | 9/2009 | Zimmerman | |
| 2009/0277964 A1* | 11/2009 | Schroder | G06K 19/0726 |
| | | | 235/492 |
| 2010/0033299 A1* | 2/2010 | Davis | G06F 1/1684 |
| | | | 340/5.1 |
| 2010/0123581 A1* | 5/2010 | Hatfield | G06K 19/07345 |
| | | | 340/572.3 |
| 2012/0031981 A1* | 2/2012 | Westlake | G06K 19/07345 |
| | | | 235/492 |
| 2013/0106577 A1 | 5/2013 | Hinman et al. | |
| 2013/0342319 A1* | 12/2013 | Rimai | G06K 19/07327 |
| | | | 340/10.1 |
| 2014/0179223 A1* | 6/2014 | Sessink | G07C 9/00309 |
| | | | 455/41.1 |
| 2016/0034728 A1 | 2/2016 | Oliver et al. | |
| 2017/0294916 A1* | 10/2017 | Finkenzeller | H04B 1/109 |
| 2020/0242441 A1* | 7/2020 | Chen | G06K 19/07345 |
| 2020/0257952 A1 | 8/2020 | Geissler | |
| 2021/0158121 A1* | 5/2021 | McBride | G06K 19/077 |
| 2022/0309258 A1* | 9/2022 | Raynesford | G06K 7/10316 |
| 2022/0327343 A1* | 10/2022 | Xie | H03J 3/02 |
| 2023/0140667 A1* | 5/2023 | Nagao | G06K 19/07749 |
| | | | 340/10.1 |

OTHER PUBLICATIONS

Tan et al., "Secure and Serverless RFID Authentication and Search Protocols", IEEE Wireless Communications, vol. 7, No. 4, Apr. 2008, 8 pages.

International Searching Authority, "Notification of Transmittal of the International Search Report and the Written Opinion of the International Searching Authority, or Declaration," Patent Cooperation Treaty, Feb. 3, 2025, 16 pages, International Application No.—PCT/ EP2024/078704.

* cited by examiner

SECURE RADIO-FREQUENCY IDENTIFICATION SYSTEM

BACKGROUND

The present invention relates generally to the field of radio frequency identification (RFID), and more particularly to reader-to-tag communications.

RFID uses electromagnetic fields to automatically identify and track RFID tags attached to objects. An RFID system consists of a radio transponder, a radio receiver, and a radio transmitter. When the RFID tag is triggered by an electromagnetic interrogation pulse from a nearby RFID reader device, the RFID tag returns digital data, usually an identifying inventory number, back to the RFID reader. This is typically performed for item identification purposes.

Unlike a barcode, the RFID tag does not need to be within the line of sight of the RFID reader. Accordingly, the RFID tag may be embedded in the tracked object. RFID systems are one type of automatic identification and data capture system.

Some RFID security concerns include the unauthorized tracking of RFID tags. RFID tags, which are typically world-readable, pose a risk to location privacy and security. Conventional RFID tags can be read at distances that permit unauthorized reading. Also, legitimate transactions with readers can be eavesdropped on at distances that are difficult to control. Another method of unauthorized tracking prevention uses cryptography, where rolling codes and/or challenge-response authentication are used to resist monitor-repetition of the messages between the RFID tag and RFID reader.

SUMMARY

In one aspect of the present invention, a method, a computer program product, and a system includes identifying a first transmission mode for interrogation signals received from an radio frequency identification (RFID) reader, the first transmission mode including two radio frequency signals; determining a responsive transmission based on the first transmission mode; and returning the responsive transmission to the RFID reader.

Another aspect of the present invention includes determining the responsive transmission by matching the first transmission mode with a local configuration for transmission modes.

Yet another aspect of the present invention includes identifying the responsive transmission by selecting a pre-defined transmission corresponding to the first transmission mode.

Still another aspect of the present invention includes detecting radio frequency (RF) signals received from the RFID reader and identifying the first transmission mode based on the received RF signals.

Still yet another aspect of the present invention includes a first transmission mode corresponding to an invalid responsive transmission according to a local configuration, the invalid transmission including an error code. A second transmission mode, different than the first transmission mode, corresponds to a valid responsive transmission according to the local configuration, the valid responsive transmission including an identification code.

DETAILED DESCRIPTION

Figure 1:
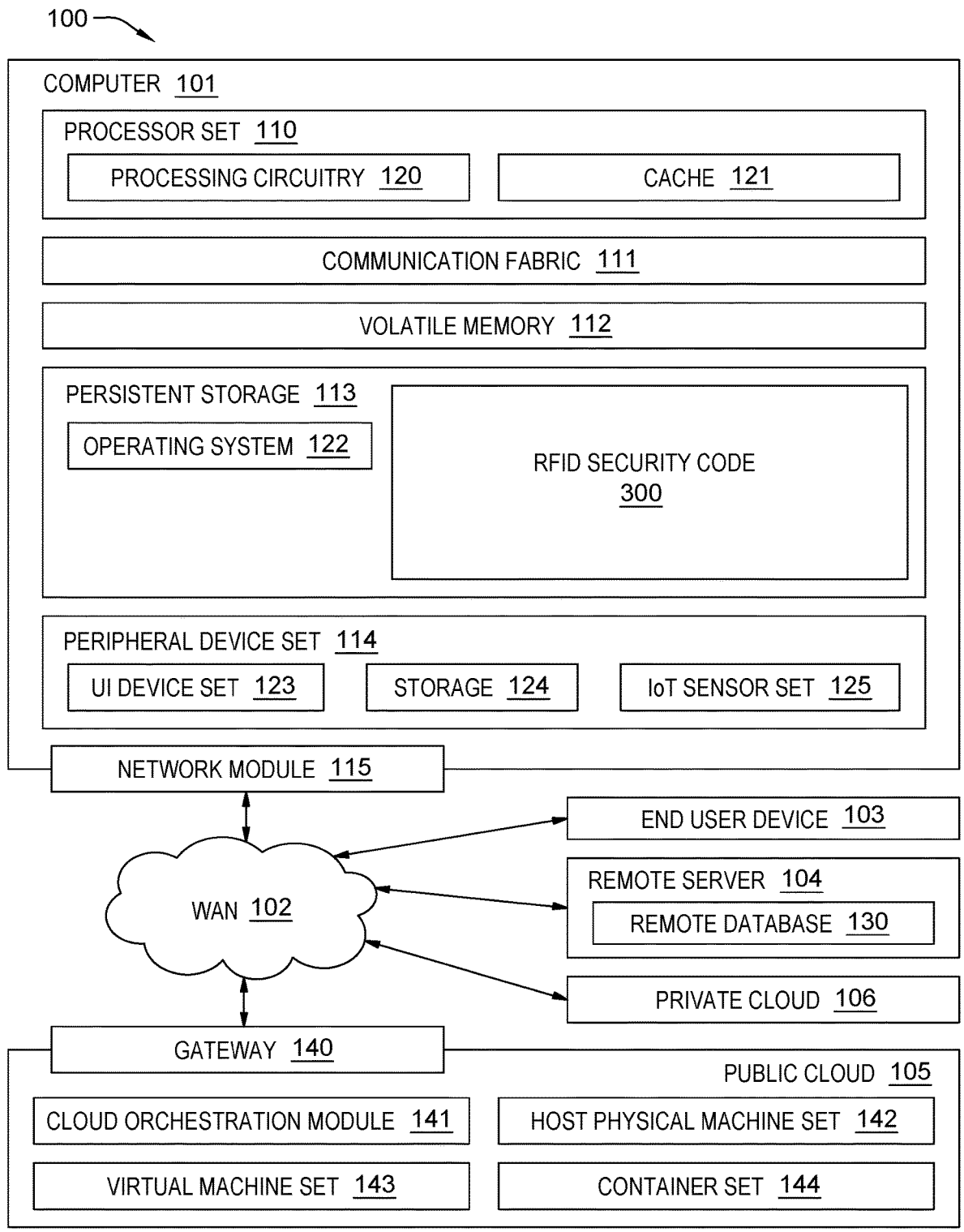
FIG. 1 is a schematic view of a first embodiment of a system according to the present invention.

A transmission mode of an interrogation from a radio frequency identification (RFID) reader is the basis for determining a responsive communication. Transmission modes matching a pre-defined pattern are the basis for returning expected information, such as an identification code. When the received interrogations do not match a transmission mode, information not helpful in identification is returned, such as, for example, a null code, an incorrect code, or an error code. An RFID tag includes a circuit for analyzing frequencies of the received interrogation, the analysis revealing the transmission mode, which may include frequency value or range, duration of transmission, and number of frequencies received during the interrogation.

The present invention may be a system, a method, and/or a computer program product. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not storage in the form of one or more transitory signals, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Computing environment 100 contains an example of an environment for the execution of at least some of the computer code involved in performing the inventive methods, such as radio frequency identification (RFID) security code 300. In addition to block 300, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 300, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 300 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in block 300 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

Radio frequency identification (RFID) security code 300 operates to receive interrogation signals from RFID readers and detect a transmission mode having a particular transmission pattern. The transmission mode is cross-referenced with local configurations to determine a responsive communication. Transmission modes matching a pre-defined pattern are the basis for returning expected information, such as an identification code. When the received interrogations do not match a transmission mode, information not helpful in identification is returned, such as, for example, a null code, an incorrect code, or an error code.

Some embodiments of the present invention recognize the following facts, potential problems and/or potential areas for improvement with respect to the current state of the art: (i) RFID is widely used and RFID security is often a concern because radio wave technology is used for communications such that anyone can obtain the tools to read conventional RFID tags; (ii) the content of an RFID tag that is encrypted requires that a key be transferred to the RFID reader over a secure network, but the RFID system for handling this process can be complex and error prone; (iii) solutions to block the reading of RFIDs in wallets are inefficient for reading many RFIDs together as when goods are shipped; (iv) near-field communications (NFC) may be used for reading RFIDs from a short-range RFID, but are not useful in traffic areas where goods are being shipped.

Some embodiments of the present invention are directed to providing a security framework for operating radio frequency identification (RFID) systems in a secure manner. The RFID system operates by interrogating an RFID tag with a radio frequency combination, or transmission mode, having pre-defined attributes for the multiple RF signals making up the RF combination. The signal attributes may include, for example: (i) frequency; (ii) frequency range; (iii) duration of signal; (iv) sequential order of signals sent/received; and/or (iv) number, or count, of signals to be sent/received during an interrogation by the RFID reader. The RFID tag identifies the transmission mode of the interrogation signals received as a radio frequency combination and sends a responsive information set according to the transmission mode. The term transmission mode, in this document, refers to the particular combination of frequencies received by the RFID tag including patterns of transmission of the radio frequencies. The radio frequency combinations include at least a pair of interrogation signals.

Some embodiments of the present invention are directed to sending data from an RFID tag based on the received transmission mode. When a valid transmission mode is detected, the RFID tag may transmit an identification code. However, when the transmission mode is not valid, the RFID tag may transmit other information not helpful in identification, such as a null code. For example, one RF mode may require two frequency ranges, each having a specified duration. When the correct RF mode is received, the correct response is returned. Otherwise, a form of non-compliant data is returned.

Some embodiments of the present invention are deployed by an RFID system including: (i) an RFID tag that identifies different radio frequencies, (ii) an RFID reader that transmits a radio frequency pair, (iii) an RFID tag for receiving radio frequency pairs from the RFID reader; and (iv) an RFID tag that returns pre-defined information responsive to the received radio frequency pairs. Some embodiments of the present invention use a lookup table for retrieving information corresponding to the received radio frequency signal pair. According to some embodiments of the present invention, the RFID tag checks a local configuration for the received RF pair and returns the data corresponding to the received RF pair, or transmission mode. The local configuration may be a circuit designed to identify valid transmission modes. Alternatively, the local configuration is a lookup table including a valid transmission mode and may include other invalid transmission modes along with corresponding responsive transmissions.

Figure 2:
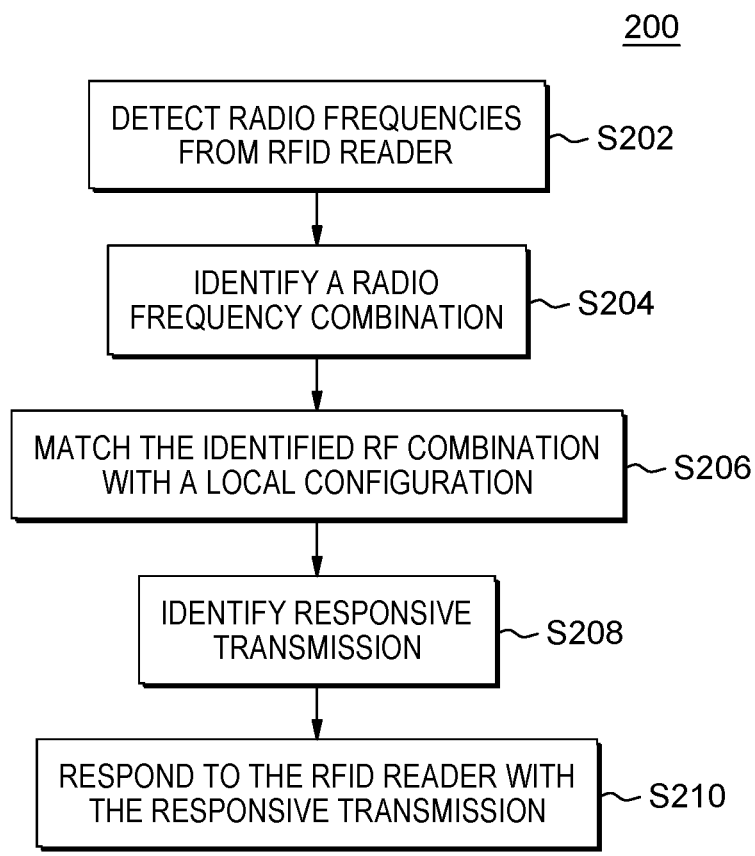
FIG. 2 is a flowchart showing a first method performed, at least in part, by the first embodiment system.
Figure 4:
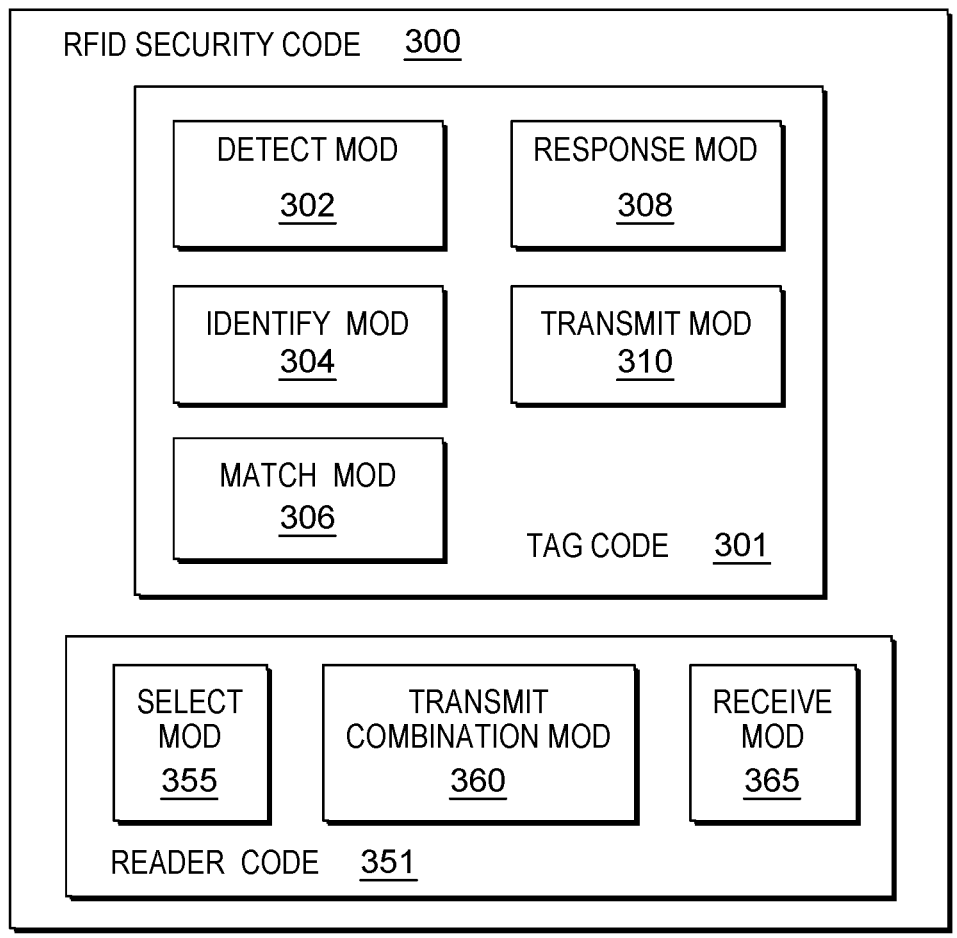
FIG. 4 is a schematic view of a machine logic (for example, software) portion of the first embodiment system.

FIG. 2 shows flowchart 200 depicting a first method according to the present invention. FIG. 4 shows program 300, including tag code 301, for performing at least some of the method steps of flowchart 200. This method and associated software will now be discussed, over the course of the following paragraphs, with extensive reference to FIG. 2 (for the method step blocks) and FIG. 4 (for the software blocks).

Processing begins at step S202, where detect module ("mod") 302 detects the radio frequencies received from the RFID reader. Radio frequencies received from the RFID reader make up the transmission mode. In this example, radio frequency values are determined via a circuit on the RFID tag that identifies various radio frequency values, see FIG. 5.

Processing proceeds to step S204, where identify mod 304 evaluates the detected radio frequencies for a radio frequency combination, or transmission mode. Detected radio frequencies are evaluated to determine a transmission mode of the signals received from the RFID reader. Transmission mode refers to target characteristics of the transmission of multiple radio frequency signals. In this example, two distinct RF signals make up the transmission mode. Alternatively, the duration between receipt of two RF signals is a target characteristic. Alternatively, the number of signals received is a target characteristic.

Processing proceeds to step S206, where match mod 306 matches the radio frequency combination with a local configuration. In this example, the local configuration is a lookup table including a valid transmission mode and may include other invalid transmission modes along with corresponding responsive transmissions. Alternatively, the local configuration is a circuit designed to identify valid transmission modes such that when a valid transmission mode is not identified, the responsive transmission is based on an invalid transmission mode being received. Further, where only one valid transmission mode is defined, any transmission mode that does not match is considered a negative match, which requires a responsive transmission having irrelevant or unexpected information, such as an error code.

Processing proceeds to step S208, where response mod 308 identifies a responsive transmission. Responsive to matching the radio frequency combination with the local configuration, the response mod identifies the corresponding responsive transmission. Where a lookup table is used, the responsive transmission is pre-defined according to the matching radio frequency combination. In this example, the responsive transmission is one or two signals, a valid response including an identification code, and an invalid response including irrelevant information such as an error code or a null code. Alternatively, different responses are indicated for different radio frequency combinations.

Processing ends at step S210, where transmit mod 310 responds to the RFID reader by sending the responsive transmission. The RFID tag responds to the RFID reader with the identified responsive transmission, which is determined according to a matching pre-defined transmission mode.

Figure 3:
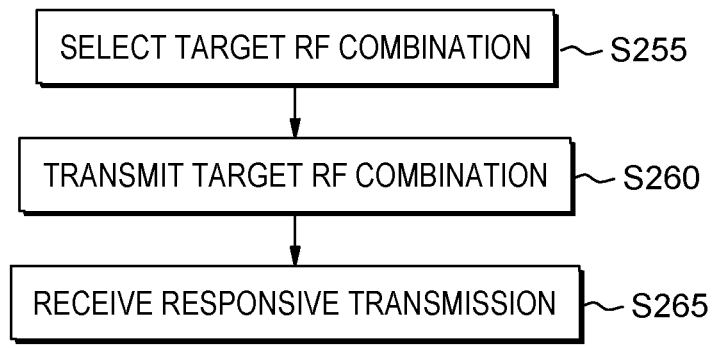
FIG. 3 is a flowchart showing a second method performed, at least in part, by the first embodiment system.

Referring now to FIG. 3, flowchart 250 depicts a second method according to an embodiment of the present invention. FIG. 4 shows program 300, including reader code 351, for performing at least some of the method steps of flowchart 250. This second method and associated software will now be discussed, over the course of the following paragraphs, with extensive reference to FIG. 3 (for the method step blocks) and FIG. 4 (for the software blocks).

Processing begins at step S255, where select module ("mod") 355 of reader code 351 selects the target radio frequency combination, or transmission mode. In this example, the RFID reader is pre-programmed to transmit a target radio frequency combination matching the RFID tag to be interrogated. The RFID tags include a receiver circuit for identifying radio frequency combinations, or transmission modes, generated by the RFID readers. Alternatively, the RFID reader includes a user-selectable radio frequency combination for interrogating RFID tags and a user selects the target radio frequency combination.

Processing proceeds to step S260, where transmit combination mod 360 transmits the target radio frequency combination. In this example, the radio frequency combination is a sequence of two different radio frequencies. Alternatively, the radio frequency combination, or transmission mode, is based on two different durations of the radio frequencies. Alternatively, the transmission mode selected in step 255 is a count of signals to be transmitted during an interrogation. Alternatively, the transmission mode selected is a set of different radio frequencies to transmit, without regard to sequential order.

Processing ends at step S265, where receive mod 365 receives a responsive transmission from the target RFID tag. The responsive transmission, if matching the radio frequency combination of the RFID tag, is useful, or expected, information, such as an identification code.

Further embodiments of the present invention are discussed in the paragraphs that follow and later with reference to FIG. 5.

Some embodiments of the present invention are directed to a secure RFID system where only an RFID reader that interrogates with the correct radio frequency combination will receive a responsive transmission having useful, or expected, information. In this example, the radio frequency combination is a pre-defined sequence of RF signals. Alternatively, an RF pair of signals regardless of sequential order is the basis for a correct RF combination. Alternatively, durations of each received RF signal at a given frequency are the basis of identifying a correct RF combination. Some embodiments of the secure RFID system include: (i) an RFID tag that detects multiple radio frequencies; (ii) an RFID reader, or interrogator, that sends out a combination of radio frequencies; (iii) an RFID tag enabled for receiving the combination of radio frequencies transmitted by the RFID interrogator; and (iv) an RFID tag that sends useful information when a predetermined combination of radio frequencies is detected.

There are various kinds of RFID systems including: (i) passive RFID Systems; (ii) active RFID Systems; and (iii) battery-assisted passive (BAP) systems. Each of the various kinds of RFID systems can receive RF signals from an RFID reader. Some embodiments of the present invention are directed to the signal modes instead of other operational aspects. In that way, some embodiments of the present invention may be applied to any of the various kinds of RFID systems.

While there are different frequency ranges for the various RFID systems, the selected frequency range of the application may be applied to various embodiments of the present invention because one may apply any of the frequency ranges successfully.

Some embodiments of the present invention are directed to more than a mere dual-frequency RFID system with a high-frequency transponder and a low-frequency transponder. Some embodiments of the present invention are directed to an RFID system that detects different radio frequencies, or RF signals, and distinguishes between different RF signals.

A RFID tag receives the radio frequency from an RFID reader, which generates electric current, then the RFID tag sends out the information stored in it with the generated electric current, electromagnetic induction is used here. With a different radio frequency, a different voltage is generated in the RFID tag, this is also from electromagnetic induction. As different voltages are detected by the RFID tag, different radio frequencies are inferred. In that way RF signals are distinguishable and sets of received RF signals at different frequencies may be identified.

A triode can be used to detect the value of voltage, so specific radio frequencies may be detected with the triode.

Figure 5:
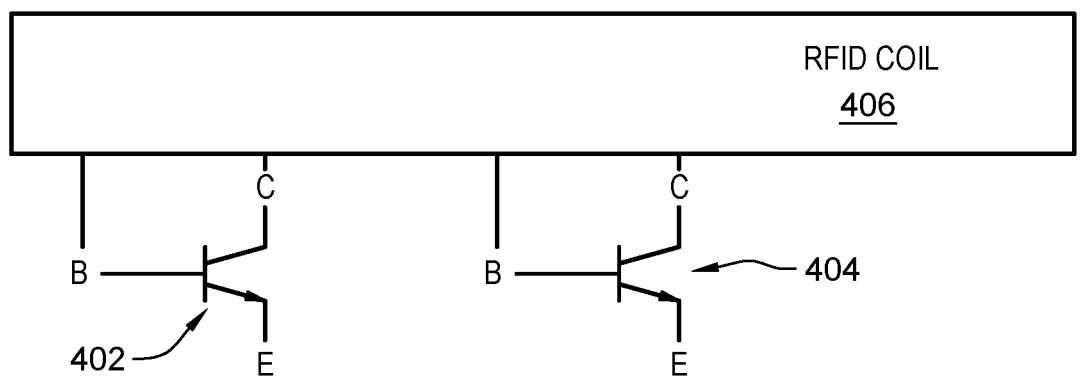
FIG. 5 is a schematic view of a first embodiment of a circuit according to the present invention.

Referring now to FIG. 5, a schematic view of RFID receiver circuit 400 that identifies pre-defined RF signal frequencies. The circuit includes triode 402, triode 404, and RFID coil 406. The indicated B and C points of the triodes are electrically connected to the RFID coil. The threshold voltage for triode 402 is X and the threshold voltage for triode 404 is Y. A pre-defined rule for the voltages is that $X<Y$. When there is an electric current at point E of the triode 402 and no electric current at the point E of triode 404, the voltage is inferred to have a value between the voltages X and Y. The corresponding radio frequency received by the RFID interrogator is derived from the inferred value range.

Different radio frequencies can be detected using circuits such as the RFID receiver circuit of FIG. 5.

Some embodiments of the present invention are performed using an enhanced RFID reader that can send out radio frequencies according to a specific order/mode/rule. For example, the rule may be to send radio frequency A with duration 10 ms, then send radio frequency B with duration 20 ms.

Some embodiments of the present invention are performed using an enhanced RFID tag. In this example, the RFID tag includes an RFID receiver circuit, such as circuit 400 shown in FIG. 5. Alternatively, other means are used to determine the values of input frequencies. The detected information is recorded for reference when determining what responsive signal to send from the RFID tag. The information detected may include, for example: (i) value of frequency; (ii) sequential order; and/or (iii) duration.

Some embodiments of the present invention are directed to an RFID system that returns corresponding information based on a received radio frequency combination. Upon determination of the RF signal frequencies received from an RFID reader, the RFID tag identifies the data and returns it to the reader.

According to some embodiments of the present invention, the RFID reader that sends the correct set of radio frequencies will receive correct data, while the RFID reader sending the wrong radio frequency or frequencies, will receive predefined incorrect data.

Some embodiments of the present invention are directed to a process where an RFID reader sends a specified radio frequency combination to a RFID tag and receives selected data from the RFID tag. The data is selected from at least two options, valid information or other information. valid information, such as an identification code, is transmitted responsive to the received radio frequency combination being the specified radio frequency combination, or one that matches a specified transmission mode. In this example, all other interrogations receive other information that is not valid or that does not include the identification code.

Some embodiments of the present invention are directed to an RFID system security protocol where an RFID reader is authenticated by characteristics of a set of transmitted interrogation signals wherein the set of signals matches a pre-defined transmission mode.

Some embodiments of the present invention are directed to a circuit for sending radio frequency combinations from an RFID reader for authentication of the reader by the receiving RFID tag.

Some embodiments of the present invention are directed to a circuit for sending radio frequency combinations from an RFID reader for authentication of the reader by the receiving RFID tag.

Some embodiments of the present invention may include one, or more, of the following features, characteristics and/or advantages: (i) RFID information is protected from unauthorized access from an outsider, such as a random encounter during transit, due to the difficulty in obtaining the needed frequency information; (ii) alternative information other than an accurate identification code may be returned by the RFID tag when unauthorized access is attempted; and/or (iii) handles a frequency combination instead of a single radio frequency to authenticate the RFID reader.

Some embodiments of the present invention are directed to a computer-implemented method including: identifying a first transmission mode for interrogation signals received from an RFID reader, the first transmission mode including two radio frequency signals; determining a responsive transmission based on the first transmission mode; and returning the responsive transmission to the RFID reader. Advantageously, the RFID information is protected from unauthorized access from an outsider, such as a random encounter during transit, due to the difficulty in obtaining the needed frequency information. The RFID system disclosed herein handles a frequency combination instead of a single radio frequency to authenticate the RFID reader.

One aspect of the computer-implemented method disclosed herein may include matching the first transmission mode with a local configuration for transmission modes. Advantageously, the RFID information is protected from unauthorized access from an outsider, such as a random encounter during transit, due to the difficulty in obtaining the needed frequency information.

Another aspect of the computer-implemented method disclosed herein may include identifying the responsive transmission by selecting a pre-defined transmission corresponding to the first transmission mode. Advantageously, alternative information other than an accurate identification code may be returned by the RFID tag when unauthorized access is attempted.

Yet another aspect of the computer-implemented method disclosed herein may include determining a sequence in which the two radio frequency signals are received from the RFID reader. Advantageously, the RFID information is protected from unauthorized access from an outsider, such as a random encounter during transit, due to the difficulty in obtaining the needed frequency information.

Still yet another aspect of the computer-implemented method disclosed herein may include determining a duration between receipt of a first signal and a second signal of the two radio frequency signals. Advantageously, the RFID information is protected from unauthorized access from an outsider, such as a random encounter during transit, due to the difficulty in obtaining the needed frequency information.

A further aspect of the computer-implemented method disclosed herein may include detecting radio frequency (RF) signals received from the RFID reader; and identifying the first transmission mode based on the received RF signals. Advantageously, the RFID system disclosed herein handles a frequency combination instead of a single radio frequency to authenticate the RFID reader.

A still further aspect of the computer-implemented method disclosed herein may be that the first transmission mode corresponds to an invalid responsive transmission according to a local configuration, the invalid transmission including an error code. Advantageously, alternative information other than an accurate identification code may be returned by the RFID tag when unauthorized access is attempted.

Still yet a further aspect of the computer-implemented method disclosed herein may be that a second transmission mode, different than the first transmission mode, corresponds to a valid responsive transmission according to the local configuration, the valid responsive transmission including an identification code. Advantageously, alternative information other than an accurate identification code may be returned by the RFID tag when unauthorized access is attempted.

Some embodiments of the present invention are directed toward a computer program product comprising a computer-readable storage medium having a set of instructions stored therein which, when executed by a processor, causes the processor to perform a method including: identifying a first transmission mode for interrogation signals received from an RFID reader, the first transmission mode including two radio frequency signals; determining a responsive transmission based on the first transmission mode; and returning the responsive transmission to the RFID reader. Advantageously, the RFID information is protected from unauthorized access from an outsider, such as a random encounter during transit, due to the difficulty in obtaining the needed frequency information. The RFID system disclosed herein handles a frequency combination instead of a single radio frequency to authenticate the RFID reader.

One aspect of the computer program product disclosed herein may further cause the processor to perform a method including matching the first transmission mode with a local configuration for transmission modes. Advantageously, the RFID information is protected from unauthorized access from an outsider, such as a random encounter during transit, due to the difficulty in obtaining the needed frequency information.

Another aspect of the computer program product disclosed herein may further cause the processor to perform a method including identifying the responsive transmission by selecting a pre-defined transmission corresponding to the first transmission mode. Advantageously, alternative information other than an accurate identification code may be returned by the RFID tag when unauthorized access is attempted.

Yet another aspect of the computer program product disclosed herein may further cause the processor to perform a method including determining a sequence in which the two radio frequency signals are received from the RFID reader. Advantageously, the RFID information is protected from unauthorized access from an outsider, such as a random encounter during transit, due to the difficulty in obtaining the needed frequency information.

Still yet another aspect of the computer program product disclosed herein may further cause the processor to perform a method including determining a duration between receipt of a first signal and a second signal of the two radio frequency signals. Advantageously, the RFID information is protected from unauthorized access from an outsider, such as a random encounter during transit, due to the difficulty in obtaining the needed frequency information.

A further aspect of the computer program product disclosed herein may further cause the processor to perform a method including detecting radio frequency (RF) signals received from the RFID reader; and identifying the first transmission mode based on the received RF signals. Advantageously, the RFID system disclosed herein handles a frequency combination instead of a single radio frequency to authenticate the RFID reader.

A still further aspect of the computer program product disclosed herein may be that the first transmission mode corresponds to an invalid responsive transmission according to a local configuration, the invalid transmission including an error code. Advantageously, alternative information other than an accurate identification code may be returned by the RFID tag when unauthorized access is attempted.

Still yet a further aspect of the computer program product disclosed herein may be that a second transmission mode, different than the first transmission mode, corresponds to a valid responsive transmission according to the local configuration, the valid responsive transmission including an identification code. Advantageously, alternative information other than an accurate identification code may be returned by the RFID tag when unauthorized access is attempted.

Some embodiments of the present invention are directed toward a computer system including: a processor set; and a computer readable storage medium. The processor set is structured, located, connected, and/or programmed to run program instructions stored on the computer readable storage medium. The program instructions, when executed by the processor set, cause the processor set to perform a method including: identifying a first transmission mode for interrogation signals received from an RFID reader, the first transmission mode including two radio frequency signals; determining a responsive transmission based on the first transmission mode; and returning the responsive transmission to the RFID reader. Advantageously, the RFID information is protected from unauthorized access from an outsider, such as a random encounter during transit, due to the difficulty in obtaining the needed frequency information. The RFID system disclosed herein handles a frequency combination instead of a single radio frequency to authenticate the RFID reader.

One aspect of the computer system disclosed herein may further cause the processor to perform a method including matching the first transmission mode with a local configuration for transmission modes. Advantageously, the RFID information is protected from unauthorized access from an outsider, such as a random encounter during transit, due to the difficulty in obtaining the needed frequency information.

Another aspect of the computer system disclosed herein may further cause the processor to perform a method including identifying the responsive transmission by selecting a pre-defined transmission corresponding to the first transmission mode. Advantageously, alternative information other than an accurate identification code may be returned by the RFID tag when unauthorized access is attempted.

Yet another aspect of the computer system disclosed herein may further cause the processor to perform a method including determining a sequence in which the two radio frequency signals are received from the RFID reader. Advantageously, the RFID information is protected from unauthorized access from an outsider, such as a random encounter during transit, due to the difficulty in obtaining the needed frequency information.

Still yet another aspect of the computer system disclosed herein may further cause the processor to perform a method including determining a duration between receipt of a first signal and a second signal of the two radio frequency signals. Advantageously, the RFID information is protected from unauthorized access from an outsider, such as a random encounter during transit, due to the difficulty in obtaining the needed frequency information.

A further aspect of the computer system disclosed herein may further cause the processor to perform a method including detecting radio frequency (RF) signals received from the RFID reader; and identifying the first transmission mode based on the received RF signals. Advantageously, the RFID system disclosed herein handles a frequency combination instead of a single radio frequency to authenticate the RFID reader.

A still further aspect of the computer system disclosed herein may be that the first transmission mode corresponds to an invalid responsive transmission according to a local configuration, the invalid transmission including an error code. Advantageously, alternative information other than an accurate identification code may be returned by the RFID tag when unauthorized access is attempted.

Still yet a further aspect of the computer system disclosed herein may be that a second transmission mode, different than the first transmission mode, corresponds to a valid responsive transmission according to the local configuration, the valid responsive transmission including an identification code. Advantageously, alternative information other than an accurate identification code may be returned by the RFID tag when unauthorized access is attempted.

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above-similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine-readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method for a radio frequency identification (RFID) system, the computer-implemented method comprising:
    identifying a first transmission mode based on a combination of interrogation signals received from an RFID reader, the combination including at least two radio frequency signals, a first signal and a second signal;
    determining a responsive transmission based on which pre-defined attributes are represented by the combination of interrogation signals; and
    returning the responsive transmission to the RFID reader.

2. The computer-implemented method of claim 1, wherein determining the responsive transmission includes:
    matching the first transmission mode with a local configuration for transmission modes.

3. The computer-implemented method of claim 1, further comprising:
    identifying the responsive transmission by selecting a pre-defined transmission mode corresponding to the first transmission mode.

4. The computer-implemented method of claim 1, wherein identifying the first transmission mode includes:
    determining a sequence in which the combination of interrogation signals are received from the RFID reader.

5. The computer-implemented method of claim 1, wherein identifying the first transmission mode includes:
    determining a duration between receipt of the first signal and the second signal of the at least two radio frequency signals.

6. The computer-implemented method of claim 1, further comprising:
    detecting radio frequency (RF) signals received from the RFID reader; and
    identifying the first transmission mode based on the received RF signals.

7. The computer-implemented method of claim 1, wherein the first transmission mode corresponds to an invalid responsive transmission according to a local configuration, the invalid responsive transmission including an error code.

8. The computer-implemented method of claim 7, wherein a second transmission mode, different than the first transmission mode, corresponds to a valid responsive transmission according to the local configuration, the valid responsive transmission including an identification code.

9. A computer program product comprising a computer-readable storage medium having a set of instructions stored therein which, when executed by a processor, causes the processor to perform a method including:
    identifying a first transmission mode based on a combination of interrogation signals received from an RFID reader, the combination including at least two radio frequency signals, a first signal and a second signal;
    determining a responsive transmission based on which pre-defined attributes are represented by the combination of interrogation signals; and
    returning the responsive transmission to the RFID reader.

10. The computer program product of claim 9, wherein determining the responsive transmission includes:
    matching the first transmission mode with a local configuration for transmission modes.

11. The computer program product of claim 9, the set of instructions further causing the processor to perform a method including:
    identifying the responsive transmission by selecting a pre-defined transmission mode corresponding to the first transmission mode.

12. The computer program product of claim 9, wherein identifying the first transmission mode includes:
    determining a sequence in which the combination of interrogation signals are received from the RFID reader.

13. The computer program product of claim 9, wherein identifying the first transmission mode includes:
    determining a duration between receipt of the first signal and the second signal of the at least two radio frequency signals.

14. The computer program product of claim 9, wherein the first transmission mode corresponds to an invalid responsive transmission according to a local configuration, the invalid responsive transmission including an error code.

15. A computer system for radio frequency identification (RFID) security, the computer system comprising:
    a processor set; and
    a computer readable storage medium;
    wherein:
    the processor set is structured, located, connected, and/or programmed to run program instructions stored on the computer readable storage medium; and
    the program instructions which, when executed by the processor set, cause the processor set to perform a method including:
        identifying a first transmission mode based on a combination of interrogation signals received from an RFID reader, the combination including at least two radio frequency signals, a first signal and a second signal;
        determining a responsive transmission based on which pre-defined attributes are represented by the combination of interrogation signals; and
        returning the responsive transmission to the RFID reader.

16. The computer system of claim 15, wherein determining the responsive transmission includes:
    matching the first transmission mode with a local configuration for transmission modes.

17. The computer system of claim 15, the program instructions further causing the processor set to perform a method including:
    identifying the responsive transmission by selecting a pre-defined transmission mode corresponding to the first transmission mode.

18. The computer system of claim 15, wherein identifying the first transmission mode includes:
    determining a sequence in which the combination of interrogation signals are received from the RFID reader.

19. The computer system of claim 15, the program instructions further causing the processor set to perform a method including:
  detecting radio frequency (RF) signals received from the RFID reader; and
  identifying the first transmission mode based on the received RF signals.

20. The computer system of claim 15, wherein the first transmission mode corresponds to an invalid responsive transmission according to a local configuration, the invalid responsive transmission including an error code.

* * * * *